(12) United States Patent
Rangan

(10) Patent No.: US 11,816,984 B1
(45) Date of Patent: Nov. 14, 2023

(54) SYSTEMS AND METHODS FOR TRAFFIC MANAGEMENT VIA INTER-PARTY RESOURCE ALLOCATION

(71) Applicant: UNITED SERVICES AUTOMOBILE ASSOCIATION (USAA), San Antonio, TX (US)

(72) Inventor: Gopinath Rangan, Milpitas, CA (US)

(73) Assignee: United Services Automobile Association (USAA), San Antonio, TX (US)

(*) Notice: Subject to any disclaimer, the term of this patent is extended or adjusted under 35 U.S.C. 154(b) by 483 days.

(21) Appl. No.: 17/028,633

(22) Filed: Sep. 22, 2020

Related U.S. Application Data

(60) Division of application No. 15/414,666, filed on Jan. 25, 2017, now Pat. No. 10,818,170, which is a
(Continued)

(51) Int. Cl.
*G08G 1/07* (2006.01)
*H04L 41/22* (2022.01)
(Continued)

(52) U.S. Cl.
CPC .............. *G08G 1/07* (2013.01); *G06Q 20/065* (2013.01); *G06Q 30/08* (2013.01); *G07B 15/063* (2013.01);
(Continued)

(58) Field of Classification Search
CPC ....... H04W 4/70; G06Q 20/065; G06Q 30/08; G07B 15/063; G08G 1/095; H04L 41/22; H04M 1/0202; H04M 2250/10
See application file for complete search history.

(56) References Cited

U.S. PATENT DOCUMENTS 7,327,280 B2 * 2/2008 Bachelder .............. G08G 1/095
340/902
7,555,445 B2 * 6/2009 Moya ..................... G06Q 30/08
705/37
(Continued)

FOREIGN PATENT DOCUMENTS

AU 2015101403 A4 11/2015
AU 2016101183 A4 9/2016
(Continued)

*Primary Examiner* — Sisay Yacob
(74) *Attorney, Agent, or Firm* — Fletcher Yoder P.C.

(57) ABSTRACT

The present application at least describes an apparatus for managing traffic. The apparatus includes a display including a graphical user interface. The apparatus also includes a non-transitory memory including information for managing traffic and a processor operably coupled to the display and memory, and configured to execute an instruction of receiving, via the graphical user interface, a request from a buyer to purchase a right of way from an entity at a traffic location. Another instruction includes reviewing, via gps, a location or route of the buyer in relation to the traffic location. Yet another instruction includes reviewing, via gps, a location or route of the entity in relation to the traffic location. Yet even another instruction includes determining, based upon the reviewed locations of the buyer and the entity, whether to send the buyer request to the entity; and sending, based upon the determination, the request to the entity.

19 Claims, 7 Drawing Sheets

Related U.S. Application Data continuation of application No. 15/409,950, filed on Jan. 19, 2017, now abandoned.

(60) Provisional application No. 62/280,783, filed on Jan. 20, 2016.

(51) Int. Cl.
  *G08G 1/095* (2006.01)
  *H04W 4/70* (2018.01)
  *G06Q 20/06* (2012.01)
  *H04M 1/02* (2006.01)
  *G06Q 30/08* (2012.01)
  *G07B 15/06* (2011.01)

(52) U.S. Cl.
  CPC ............ *G08G 1/095* (2013.01); *H04L 41/22* (2013.01); *H04M 1/0202* (2013.01); *H04W 4/70* (2018.02); *H04M 2250/10* (2013.01)

(56) References Cited

U.S. PATENT DOCUMENTS

| | | | |
|---|---|---|---|
| 9,142,127 B1* | 9/2015 | McDevitt-Pimbley | ............... G08G 1/052 |
| 9,336,679 B1* | 5/2016 | Chitale | ............... G08G 1/0141 |
| 11,047,702 B1* | 6/2021 | Meyer | ............... G01C 21/3632 |
| 2004/0073502 A1* | 4/2004 | Agrawal | ............... G06Q 40/00 705/35 |
| 2007/0032245 A1* | 2/2007 | Alapuranen | ........... G08G 1/161 370/328 |
| 2010/0153193 A1* | 6/2010 | Ashby | ..................... G01W 1/10 705/13 |
| 2015/0073936 A1* | 3/2015 | Peterson | ........... G06Q 30/0282 705/26.9 |
| 2015/0206106 A1 | 7/2015 | Yago | |
| 2015/0262139 A1 | 9/2015 | Shtylman | |
| 2015/0262172 A1 | 9/2015 | Rebernik | |
| 2015/0262176 A1 | 9/2015 | Langschaedel et al. | |
| 2015/0332395 A1 | 11/2015 | Walker et al. | |
| 2015/0356524 A1 | 12/2015 | Pennanen | |
| 2015/0356555 A1 | 12/2015 | Pennanen | |
| 2015/0365283 A1 | 12/2015 | Ronca et al. | |
| 2015/0379510 A1 | 12/2015 | Smith | |
| 2016/0171576 A1* | 6/2016 | Dryden | ............... G06Q 30/0613 705/80 |
| 2016/0203477 A1 | 7/2016 | Yang et al. | |
| 2017/0011460 A1 | 1/2017 | Molinari et al. | |
| 2017/0032421 A1* | 2/2017 | Semple | ................. G06Q 30/02 |
| 2017/0033932 A1 | 2/2017 | Truu et al. | |
| 2017/0046689 A1 | 2/2017 | Lohe et al. | |
| 2017/0048209 A1 | 2/2017 | Lohe et al. | |
| 2017/0048234 A1 | 2/2017 | Lohe et al. | |
| 2017/0048235 A1 | 2/2017 | Lohe et al. | |
| 2017/0053249 A1 | 2/2017 | Tunnell et al. | |
| 2017/0083907 A1 | 3/2017 | McDonough et al. | |
| 2017/0085545 A1 | 3/2017 | Lohe et al. | |
| 2017/0085555 A1 | 3/2017 | Bisikalo et al. | |
| 2017/0091756 A1 | 3/2017 | Stern et al. | |
| 2017/0103391 A1 | 4/2017 | Wilson, Jr. et al. | |
| 2017/0109748 A1 | 4/2017 | Kote | |
| 2017/0118301 A1 | 4/2017 | Kouru et al. | |
| 2017/0124647 A1 | 5/2017 | Pierce et al. | |
| 2017/0132630 A1 | 5/2017 | Castinado et al. | |
| 2017/0140375 A1 | 5/2017 | Kunstel | |
| 2017/0140408 A1 | 5/2017 | Wuehler | |
| 2017/0148016 A1 | 5/2017 | Davis | |
| 2017/0213198 A1 | 7/2017 | Ochynski | |
| 2017/0221022 A1 | 8/2017 | Goloshchuk | |
| 2017/0221053 A1 | 8/2017 | Goloshchuk | |
| 2017/0228704 A1 | 8/2017 | Zhou et al. | |
| 2017/0230189 A1 | 8/2017 | Toll et al. | |
| 2017/0230375 A1 | 8/2017 | Kurian | |
| 2017/0243177 A1 | 8/2017 | Johnsrud et al. | |
| 2017/0243209 A1 | 8/2017 | Johnsrud et al. | |
| 2017/0243286 A1 | 8/2017 | Castinado et al. | |
| 2017/0244757 A1 | 8/2017 | Castinado et al. | |
| 2017/0255912 A1 | 9/2017 | Casebolt | |
| 2017/0287068 A1 | 10/2017 | Nugent | |
| 2017/0358025 A1* | 12/2017 | Varma | ................. G06Q 20/145 |
| 2021/0152687 A1* | 5/2021 | Reber | ................. G08B 25/006 |
| 2021/0195387 A1* | 6/2021 | Kim | ....................... A62B 18/10 |
| 2021/0203768 A1* | 7/2021 | Dupre | ............... H04M 1/72457 |
| 2021/0274442 A1* | 9/2021 | Hayashi | ................. H04B 1/44 |
| 2021/0311207 A1* | 10/2021 | Stählin | ................. H04W 4/40 |
| 2021/0409043 A1* | 12/2021 | Duan | ................. H04M 1/0264 |
| 2022/0150682 A1* | 5/2022 | Beyer, Jr | ............. H04W 64/00 |
| 2022/0217232 A1* | 7/2022 | Nachbar | ................. H04W 4/027 |
| 2022/0365017 A1* | 11/2022 | Tai | ....................... G01N 27/416 |
| 2022/0400359 A1* | 12/2022 | Mazzeo | ............. H04M 1/0214 |

FOREIGN PATENT DOCUMENTS

| | | |
|---|---|---|
| AU | 2016101976 A4 | 12/2016 |
| CN | 105681301 A | 6/2016 |
| CN | 106097101 A | 11/2016 |
| CN | 106230808 A | 12/2016 |
| CN | 106408299 A | 2/2017 |
| CN | 106411774 A | 2/2017 |
| CN | 106504089 A | 3/2017 |
| CN | 106682984 A | 5/2017 |
| CN | 106920169 A | 7/2017 |
| CN | 106952157 A | 7/2017 |
| JP | 6190907 B1 | 9/2017 |
| KR | 20160009301 A | 1/2016 |
| KR | 101727525 B1 | 4/2017 |
| KR | 101773073 B1 | 8/2017 |
| KR | 101773074 B1 | 8/2017 |
| WO | 2016189311 A1 | 12/2016 |
| WO | 2016204461 A1 | 12/2016 |
| WO | 2017091530 A1 | 6/2017 |
| WO | 2017098519 A1 | 6/2017 |
| WO | 2017136956 A1 | 8/2017 |
| WO | 2017139688 A1 | 8/2017 |
| WO | 2017163220 A1 | 9/2017 |
| WO | 2017170912 A1 | 10/2017 |

\* cited by examiner

SYSTEMS AND METHODS FOR TRAFFIC MANAGEMENT VIA INTER-PARTY RESOURCE ALLOCATION

CROSS-REFERENCE TO RELATED APPLICATIONS

This application is a Divisional Application of U.S. patent Ser. No. 15/414,666, filed on Jan. 25, 2017, which is a Continuation Application of U.S. application Ser. No. 15/409,950 filed Jan. 19, 2017, which further claims the benefit of priority of U.S. Provisional Application No. 62/280,783 filed on Jan. 20, 2016, entitled, "Systems and Methods for Traffic Management Via Inter-Party Resource Allocation," the contents of which is incorporated by reference in its entirety.

BACKGROUND

Traffic management is considered to be an important logistical aspect in the field of transportation. Specifically, traffic management involves planning, controlling and purchasing necessary transport services to move vehicles from one location to another. With regard to road traffic control, this involves directing vehicular and pedestrian traffic around obstacles, such as for example, construction zones, accidents or other road disruptions.

Presently, vehicle traffic management is poorly controlled. Most traffic decisions are made months or years earlier. A direct effect includes increased commuting times in urban areas. In turn, a higher likelihood of accidents is observed. The opportunity to affect the flow of traffic in real-time, in an efficient manner, is deficient in the field.

What is desired in the field is a method and architecture for efficiently managing traffic patterns.

What is also desired in the field is a smart traffic light capable of communicating with an application for managing traffic patterns.

SUMMARY

This summary is provided to introduce a selection of concepts in a simplified form that are explained in more depth in the detailed description below. This summary is not intended to limit the scope of the claimed subject matter. The foregoing needs are met, to a great extent, by the present application directed to apparatuses, systems and methods for managing traffic.

In a first aspect of the application, an apparatus for managing traffic is described. The apparatus includes a display including a graphical user interface. The apparatus also includes a non-transitory memory including information for managing traffic. The apparatus further includes a processor operably coupled to the display and the non-transitory memory, and configured to execute a set of instructions. One of the instructions includes receiving, via the graphical user interface, a request from a buyer to purchase a right of way from an entity at a traffic location. Another instruction includes reviewing, via gps, a location or route of the buyer in relation to the traffic location. Yet another step includes reviewing, via gps, a location or route of the entity in relation to the traffic location. Yet even another step includes determining, based upon the reviewed locations of the buyer and the entity, whether to send the buyer request to the entity; and sending, based upon the determination, the request to the entity.

In a second aspect of the application, an apparatus for managing traffic is described. The apparatus includes a display including a graphical user interface. The apparatus also includes a non-transitory memory including information for managing traffic. The apparatus further includes a processor operably coupled to the display and the non-transitory memory and configured to execute a set of instructions. The instructions include receiving, via the graphical user interface, a request from a seller to provide a right of way to an entity at a traffic location. The instructions also include reviewing, via gps, a location of the seller in relation to the traffic location. The instructions also include reviewing, via gps, a location of the entity in relation to the traffic location. The instructions further include determining, based upon the reviewed locations of the seller and the entity, whether to send the seller request to the entity. The instructions even further include sending, based upon the determination, the request to the entity.

In a third aspect of the application, a smart traffic light for managing traffic. The smart traffic light includes plural lights of different colors. The smart traffic light also includes a transceiver for communicating with a traffic management application. The smart traffic light also includes a controller including a processor that communicates with the traffic management application, and is configured to execute a set of instructions. One of the instructions includes receiving, from the traffic management application associated with a user, a request to alter a traffic situation. Another one of the instructions includes reviewing information in the request associated with approval for updating a traffic pattern. Even further, the processor is configured to send instructions to a signal function to update the signal.

BRIEF DESCRIPTION OF THE DRAWINGS

The above-mentioned features and aspects of the present disclosure will become more apparent with reference to the following description taken in conjunction with the accompanying drawings where like reference numerals denote like elements and in which.

DETAILED DESCRIPTION OF CERTAIN EMBODIMENTS

Figure 1A:
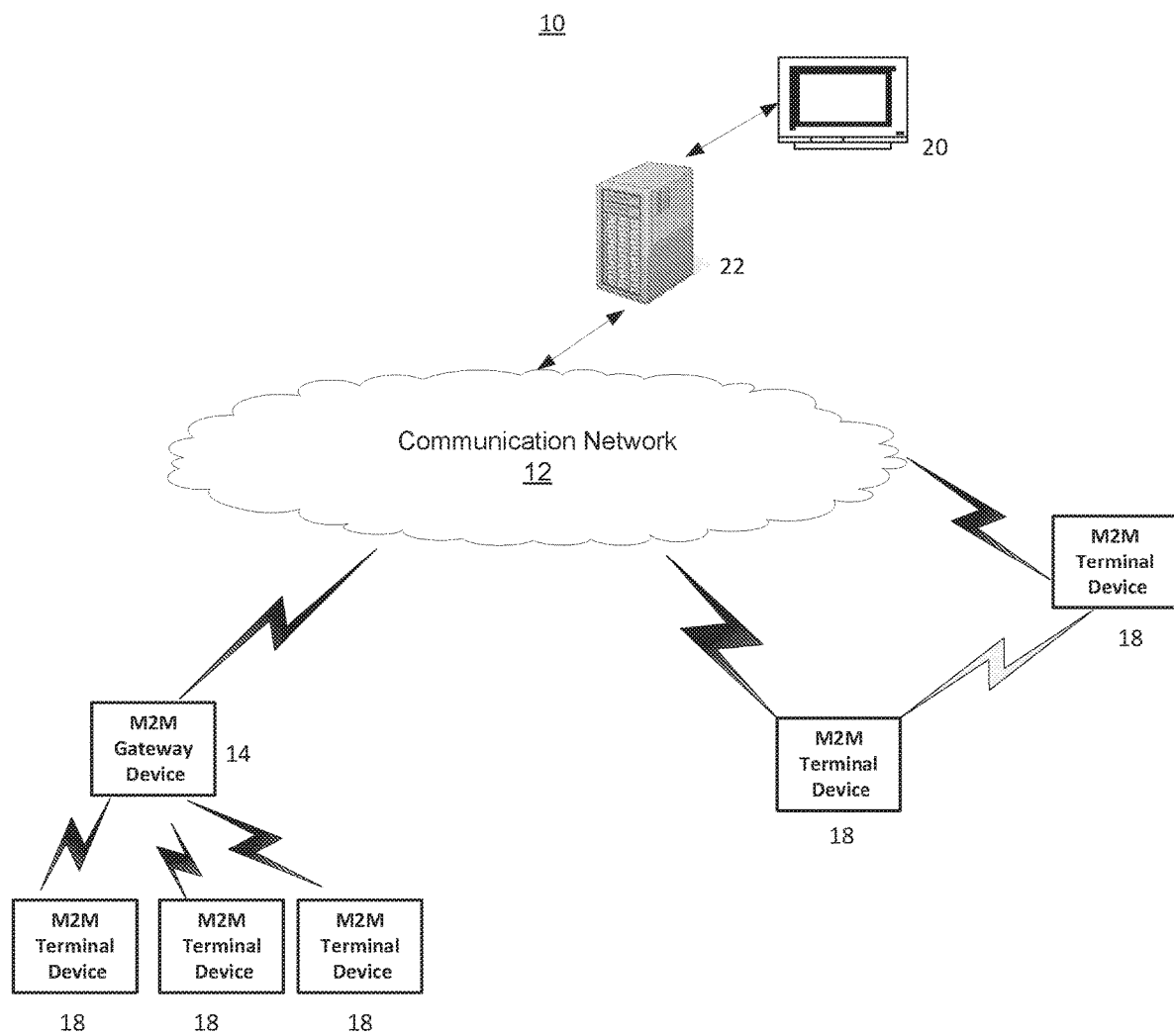
FIG. 1A illustrates a machine-to machine (M2M) or IoT communication system according to an aspect of the application.

A detailed description of the illustrative embodiments will be discussed in reference to various figures, embodiments and aspects herein. Although this description provides detailed examples of possible implementations, it should be understood that the details are intended to be examples and thus do not limit the scope of the application.

Reference in this specification to "one embodiment," "an embodiment," "one or more embodiments," "an aspect" or the like means that a particular feature, structure, or characteristic described in connection with the embodiment is included in at least one embodiment of the disclosure. Moreover, the term "embodiment" in various places in the specification is not necessarily referring to the same embodiment. That is, various features are described which may be exhibited by some embodiments and not by others.

It is to be appreciated that certain embodiments of this invention as discussed below are software algorithms, programs or code residing on a computer readable medium having control logic for enabling execution on a machine having a computer processor. The machine typically includes memory storage configured to provide output from execution of the computer algorithm or program. As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the invention based on the above-described embodiments.

The present application is directed to systems and methods that provide unique and creative solutions to existing problems in the art with regard to managing traffic. By employing the architectures and methods described herein, one skilled in the art will readily envisage scenarios showing a reduction in traffic and improved flow. As a direct result, the instant application provides benefits and solutions to the field of software and computer-related architectures by allowing them to interface with one another to minimize traffic congestion. The instant application also provides solutions to problems in other technological fields, such as for example, (i) reducing traffic collisions, (ii) reducing road-rage, and (iii) improving the well-being of drivers and individuals at traffic locations.

Prior to explaining the above-mentioned features in more detail an explanation of the concepts of bitcoin or any other cryptocurrency and block chain will be provided below. In addition the general architecture which may be employed by the architecture is discussed in detail thereafter.

Bitcoin

Bitcoin is a unit of currency of a peer-to-peer system that is not regulated by any central or governmental authority. Rather, the regulation of bitcoins (i.e., the issuance of new bitcoins and the tracking of transactions involving bitcoins) may be accomplished collectively by the network of people and businesses that conduct business with bitcoins.

While bitcoins are currently created by solving proof-of-work problems, the bitcoin network is programmed to gradually approach a maximum number of 21,000,000 available bitcoins. Specifically, the bitcoin supply is programmed to grow as a geometric series approximately every 4 years such that by 2013 half of the total available supply of bitcoins will be generated, and by 2017, 75% of the total available supply of bitcoins will be generated. Accordingly, to provide liquidity in the bitcoin supply, bitcoins are divisible to eight decimal places (i.e., to facilitate the use of fractional bitcoins).

Once generated or mined, a bitcoin may be stored in a person's bitcoin "wallet" which may be either stored on the person's computer by the bitcoin software or hosted on a third-party website. The wallet may show users their available bitcoin balance, any transaction history, and the collection of bitcoin addresses they may use to send and receive bitcoins with other users. If an owner of a bitcoin decides to: (i) exchange a quantity of bitcoins for another form of currency, such as for U.S. dollars, and/or used (ii) use a quantity of bitcoins as a form of payment for goods or services, the owner of a bitcoin transfers the bitcoin to a payee by digitally signing a hash of the previous transaction (involving the bitcoin or any other cryptocurrency) and a public key of the payee and then adding these to the end of the bitcoin address. With such information viewable in the bitcoin address, the payee can verify the chain of ownership. For example, when a bitcoin belonging to user A is transferred to user B, user A's ownership over that bitcoin is relinquished by adding user B's public key address to the bitcoin coin and signing the result with the private key that is associated with user A's address. User B now owns the bitcoin and can transfer it further. In this example, user A is prevented from transferring the already spent bitcoin to other users because a public list of all previous transactions may be collectively maintained by the network.

Compared to existing types of available currency, bitcoins appear to have an increased level of anonymity. That is, while a person who has deposited an amount of an available currency, such as an amount of U.S. dollars, at a bank may be required to provide their identification to withdraw their deposited funds and/or transfer their deposited funds to another person, bitcoins are anonymous and do not require any identification (other than a randomly generated key address) of the people currently owning such bitcoins. Additionally, compared to existing types of available currency which rely on a central authority, such as a bank, to accurately maintain records regarding an amount of currency a person has deposited and to make an amount of deposited currency available to a person upon a person's request, bitcoins do not rely on any central authority to maintain any account balances.

General Architecture

FIG. 1A is a diagram of an example machine-to machine (M2M), Internet of Things (IoT), or Web of Things (WoT) communication system 10 in which one or more disclosed embodiments may be implemented. As shown in FIG. 1A, the M2M/IoT/WoT communication system 10 includes a communication network 12. The communication network 12 may be a fixed network, e.g., Ethernet, Fiber, ISDN, PLC, or the like or a wireless network, e.g., WLAN, cellular, or the like, or a network of heterogeneous networks. For example, the communication network 12 may comprise of multiple access networks that provides content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 1A, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. It will be appreciated that any number of M2M gateway devices 14 and M2M terminal devices 18 may be included in the M2M/IoT/WoT communication system 10 as desired. Each of the M2M gateway devices 14 and M2M terminal devices 18 are configured to transmit and receive signals via the communication network 12 or direct radio link. The M2M gateway device 14 allows wireless M2M devices, e.g., cellular and non-cellular as well as fixed network M2M devices, e.g., PLC, to communicate either through operator networks, such as the communication network 12 or direct radio link. For example, the M2M devices 18 may collect data and send the data, via the communication network 12 or direct radio link, to an M2M application 20 or M2M devices 18. The M2M devices 18 may also receive data from the M2M application 20 or an M2M device 18. Further, data and signals may be sent to and received from the M2M application 20 via an M2M service layer 22, as described below M2M devices 18 and gateways 14 may communicate via various networks including, cellular, WLAN, WPAN, e.g., Zigbee, 6LoWPAN, Bluetooth, direct radio link, and wireline for example.

Figure 1B:
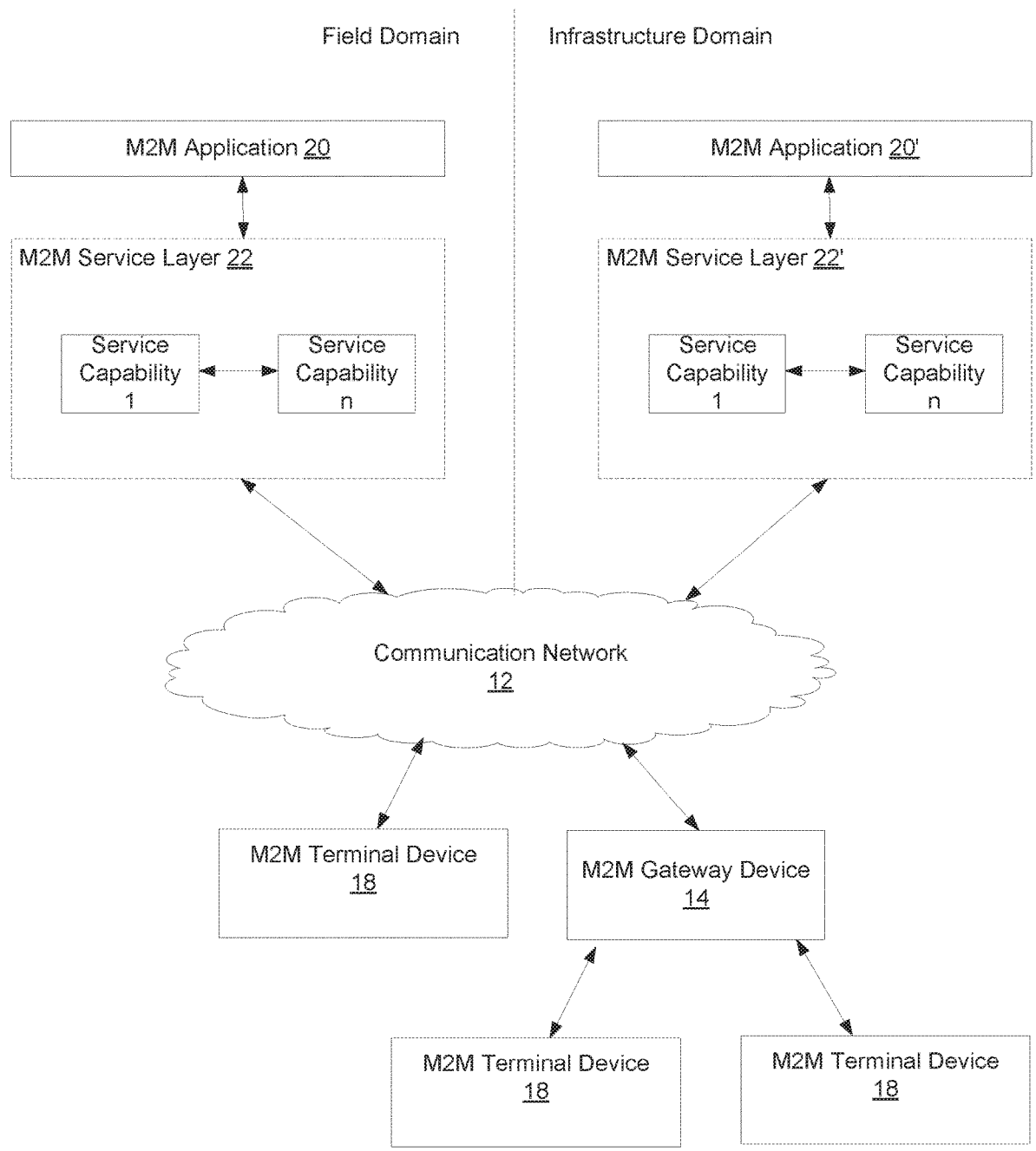
FIG. 1B illustrates an application of a M2M service platform according to an aspect of the application.

Referring to FIG. 1B, the illustrated M2M service layer 22 in the field domain provides services for the M2M application 20, M2M gateway devices 14, and M2M terminal devices 18 and the communication network 12. It will be understood that the M2M service layer 22 may communicate with any number of M2M applications, M2M gateway devices 14, M2M terminal devices 18 and communication networks 12 as desired. The M2M service layer 22 may be implemented by one or more servers, computers, or the like. The M2M service layer 22 provides service capabilities that apply to M2M terminal devices 18, M2M gateway devices 14 and M2M applications 20. The functions of the M2M service layer 22 may be implemented in a variety of ways. For example, the M2M service layer 22 could be implemented in a web server, in the cellular core network, in the cloud, etc.

Similar to the illustrated M2M service layer 22, there is the M2M service layer 22' in the Infrastructure Domain. M2M service layer 22' provides services for the M2M application and the underlying communication network 12' in the infrastructure domain. M2M service layer 22' also provides services for the M2M gateway devices 14 and M2M terminal devices 18 in the field domain. It will be understood that the M2M service layer 22' may communicate with any number of M2M applications, M2M gateway devices and M2M terminal devices. The M2M service layer 22' may interact with a service layer by a different service provider. The M2M service layer 22' may be implemented by one or more servers, computers, virtual machines, e.g., cloud/compute/storage farms, etc., or the like.

Referring also to FIG. 1B, the M2M service layer 22 and 22' provide a core set of service delivery capabilities that diverse applications and verticals can leverage. These service capabilities enable M2M applications 20 and 20' to interact with devices and perform functions such as data collection, data analysis, device management, security, billing, service/device discovery etc. Essentially, these service capabilities free the applications of the burden of implementing these functionalities, thus simplifying application development and reducing cost and time to market. The service layer 22 and 22' also enables M2M applications 20 and 20' to communicate through various networks 12 and 12' in connection with the services that the service layer 22 and 22' provide.

The M2M applications 20 and 20' may include applications in various industries such as, without limitation, real estate, financials, transportation, health and wellness, connected home, energy management, asset Tracking, and security and surveillance. As mentioned above, the M2M service layer, running across the devices, gateways, and other servers of the system, supports functions such as, for example, data collection, device management, security, billing, location Tracking/geo-fencing, device/service discovery, and legacy systems integration, and provides these functions as services to the M2M applications 20 and 20'. Moreover, the M2M service layer of the traffic management application may also be configured to interface with other devices such as LLN devices including smartphones or wearable technology such as watches, wristbands or other apparel, and smart traffic lights as discussed in this application and as illustrated in the figures.

The service layer is a software middleware layer that supports value-added service capabilities through a set of Application Programming Interfaces (APIs) and underlying networking interfaces. Both ETSI M2M and one M2M use a service layer that may contain this method of reserving a Track. ETSI M2M's service layer is referred to as the Service Capability Layer (SCL). The SCL may be implemented within an M2M device (where it is referred to as a device SCL (DSCL)), a gateway (where it is referred to as a gateway SCL (GSCL)) and/or a network node (where it is referred to as a network SCL (NSCL)). The one M2M service layer supports a set of Common Service Functions (CSFs), e.g., service capabilities. An instantiation of a set of one or more particular types of CSFs is referred to as a Common Services Entity (CSE) which can be hosted on different types of network nodes, e.g., infrastructure node, middle node, application-specific node.

Figure 1C:
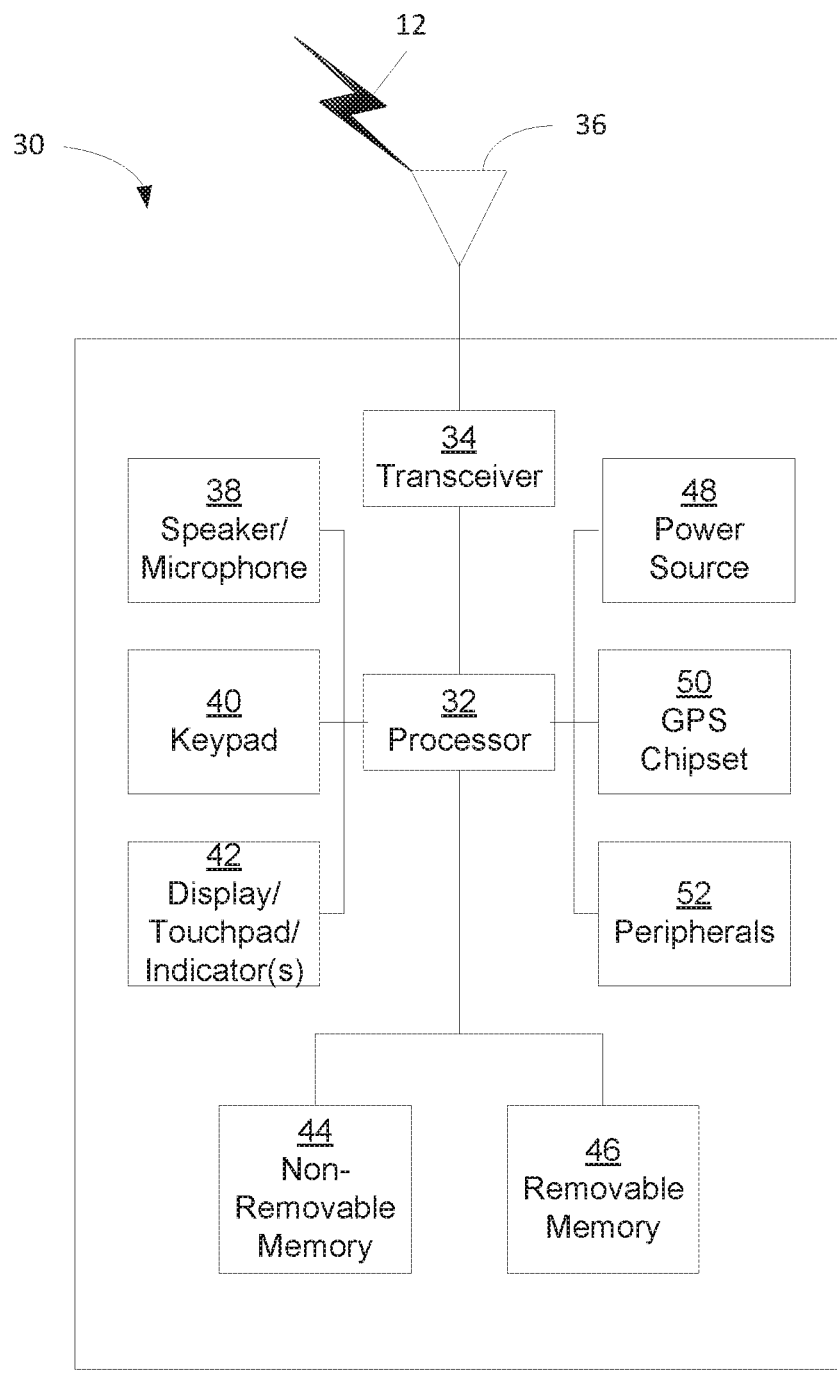
FIG. 1C illustrates a system diagram of an exemplary M2M device according to an aspect of the application.

FIG. 1C is a system diagram of an example M2M device 30, such as a M2M terminal device 18 or an M2M gateway device 14 for example. As shown in FIG. 1C, the M2M device 30 may include a processor 32, a transceiver 34, a transmit/receive element 36, a speaker/microphone 38, a keypad 40, a display/touchpad/indicator(s) 42, non-removable memory 44, removable memory 46, a power source 48, a global positioning system (GPS) chipset 50, and other peripherals 52. The display may also include a graphical user interface (GUI) allowing users to request control of traffic conditions. It will be appreciated that the M2M device 40 may include any sub-combination of the foregoing elements while remaining consistent with an embodiment. This device may be a device that uses the disclosed systems and methods for embedded semantics naming of sensory data. The M2M device 30 may also be employed with other devices, including for example smartphones, wearable technology and smart traffic lights as described in this application and as illustrated in the figures.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 32 may perform signal coding, data processing, power control, input/output processing, and/or any other functionality that enables the M2M device 30 to operate in a wireless environment. The processor 32 may be coupled to the transceiver 34, which may be coupled to the transmit/receive element 36. While FIG. 1C depicts the processor 32 and the transceiver 34 as separate components, it will be appreciated that the processor 32 and the transceiver 34 may be integrated together in an electronic package or chip. The processor 32 may perform application-layer programs, e.g., browsers, and/or radio access-layer (RAN) programs and/or communications. The processor 32 may perform security operations such as authentication, security key agreement, and/or cryptographic operations, such as at the access-layer and/or application layer for example.

The transmit/receive element 36 may be configured to transmit signals to, or receive signals from, an M2M service platform 22. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 1C as a single element, the M2M device 30 may include any number of transmit/receive elements 36. More specifically, the M2M device 30 may employ MIMO technology. Thus, in an embodiment, the M2M device 30 may include two or more transmit/receive elements 36, e.g., multiple antennas, for transmitting and receiving wireless signals.

The transceiver 34 may be configured to modulate the signals that are to be transmitted by the transmit/receive element 36 and to demodulate the signals that are received by the transmit/receive element 36. As noted above, the M2M device 30 may have multi-mode capabilities. Thus, the transceiver 34 may include multiple transceivers for enabling the M2M device 30 to communicate via multiple RATs, such as UTRA and IEEE 802.11, for example.

The processor 32 may access information from, and store data in, any type of suitable memory, such as the non-removable memory 44 and/or the removable memory 46. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the M2M device 30, such as on a server or a home computer.

The processor 32 may receive power from the power source 48, and may be configured to distribute and/or control the power to the other components in the M2M device 30. The power source 48 may be any suitable device for powering the M2M device 30. For example, the power source 48 may include one or more dry cell batteries, e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information, e.g., longitude and latitude, regarding the current location of the M2M device 30. It will be appreciated that the M2M device 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include an accelerometer, an e-compass, a satellite transceiver, a sensor, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1D:
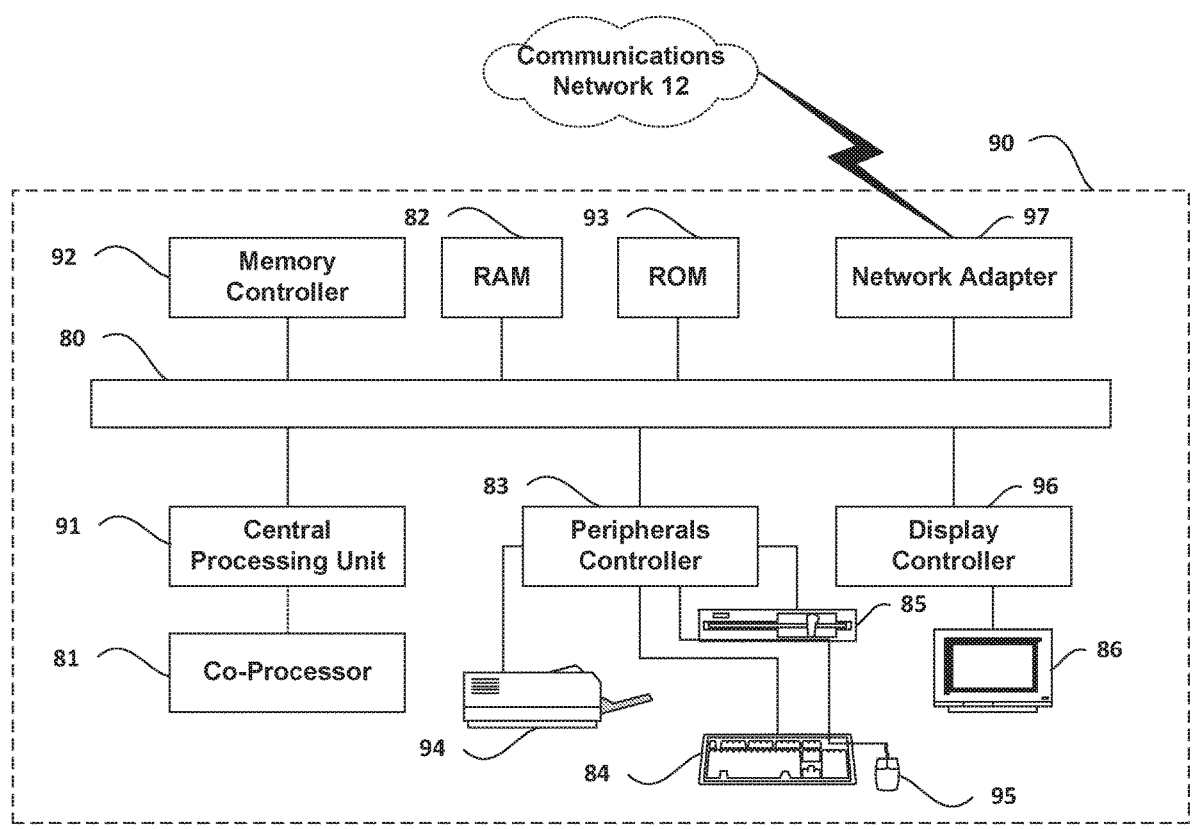
FIG. 1D illustrates a block diagram of an exemplary computing system according to an aspect of the application.

FIG. 1D is a block diagram of an exemplary computing system 90 on which, for example, the M2M service platform 22 of FIG. 1A and FIG. 1B may be implemented. Computing system 90 may comprise a computer or server and may be controlled primarily by computer readable instructions, which may be in the form of software, wherever, or by whatever means such software is stored or accessed. Such computer readable instructions may be executed within central processing unit (CPU) 91 to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91 that performs additional functions or assists CPU 91. CPU 91 and/or coprocessor 81 may receive, generate, and process data related to the disclosed systems and methods for embedded semantic naming, such as queries for sensory data with embedded semantic names. The computing system 90 may include a smart traffic light, smartphone or wearable technology that is easily accessible by a person wishing to help manage or improve traffic conditions.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memory devices coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86. Display 86, may display sensory data in files or folders using embedded semantics names. Further, computing system 90 may contain network adaptor 97 that may be used to connect computing system 90 to an external communications network, such as network 12 of FIG. 1A and FIG. 1B.

According to the present application, it is understood that any or all apparatuses, systems, methods and processes described herein may be embodied in the form of computer executable instructions, e.g., program code, stored on a computer-readable storage medium which instructions, when executed by a machine, such as a computer, server, M2M terminal device, M2M gateway device, or the like, perform and/or implement the systems, methods and processes described herein. Specifically, any of the steps, operations or functions described above may be implemented in the form of such computer executable instructions. Computer readable storage media include volatile and nonvolatile, removable and non-removable media implemented in any method or technology for storage of information, but such computer readable storage media do not includes signals. Computer readable storage media include, but are not limited to, RAM, ROM, EEPROM, flash memory or other memory technology, CD ROM, digital versatile disks (DVD) or other optical disk storage, magnetic cassettes, magnetic tape, magnetic disk storage or other magnetic storage devices, or any other physical medium which can be used to store the desired information and which can be accessed by a computer.

Traffic Management

Figure 2:
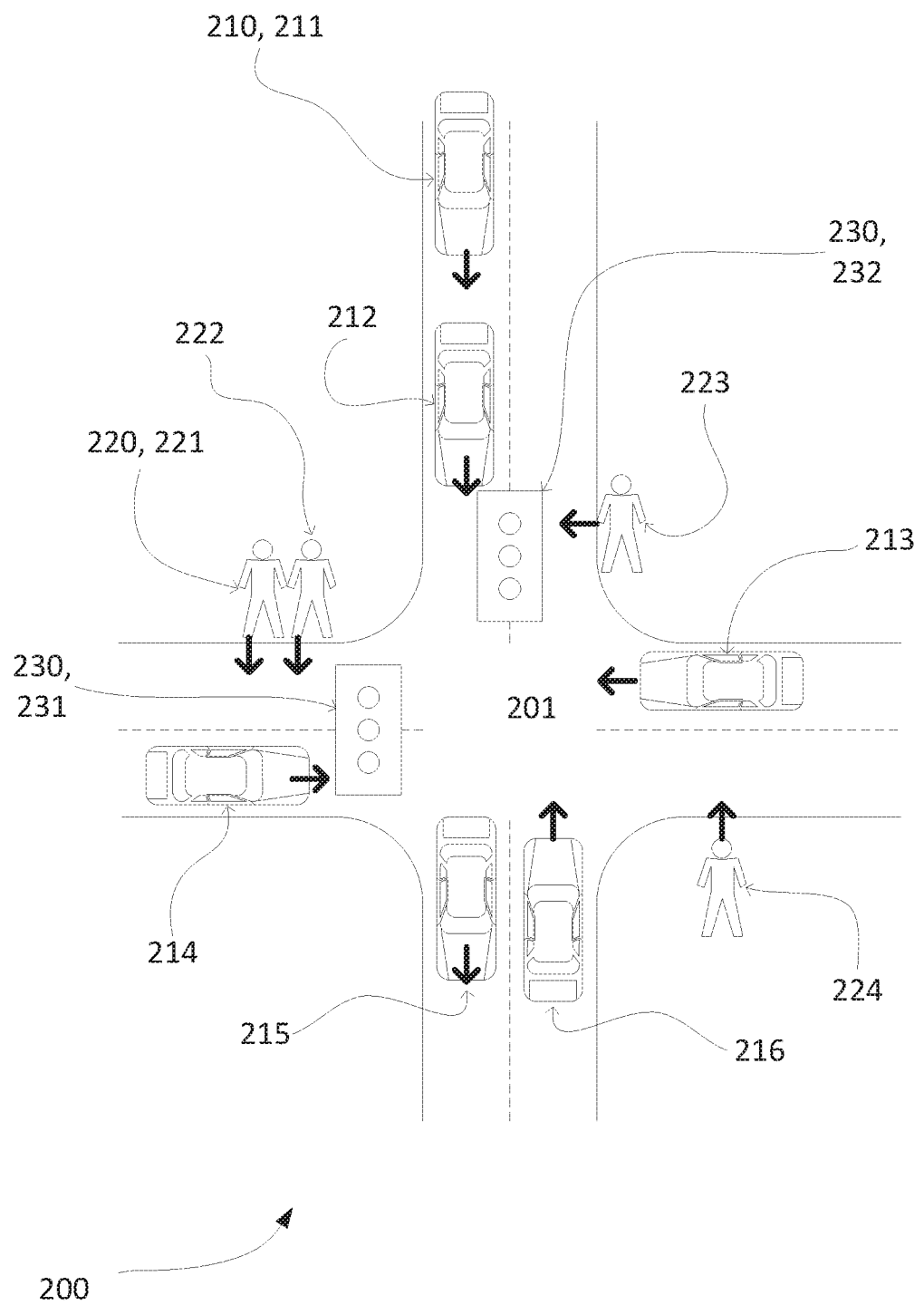
FIG. 2 is an exemplary representation of an intersection according to an aspect of the application.

According to an aspect of the application as illustrated in FIG. 2 as an exemplary embodiment, traffic management techniques and architectures are described with regard to a traffic scenario 200 at a street intersection 201. The traffic location may also include detours around hazards, traffic jams, turning onto side streets from a main road, or crossing roads without crosswalks. Here, the pedestrians 220 include pedestrians 221, 222, 223, and 224, and the drivers 210 include drivers 211, 212, 213, 214, 215, and 216. Although FIG. 2 depicts drivers 210 all operating cars, it is envisaged according to this application that drivers 210 may operate any type of motorized or non-motorized vehicle including but not limited to a motorcycle, truck, car, bicycle, unicycle or Segway.

Traffic can be managed at the intersection 201 via traffic lights. It is envisaged in this application that the traffic lights are smart and can interface with external computing systems including applications running on hardware for managing traffic patterns. As will be discussed below in more detail, the traffic light 201 may be configured to change signals based upon prompts received from external computing systems, such as for example, a traffic management application running on an apparatus. For example, a request may be received by driver 212 from driver 216 at the four-way traffic intersection 201. Namely, driver 216 may wish to turn left at the traffic intersection 201. If driver 212 has not indicated turning at the intersection, i.e., going straight, driver 216 may be inclined to send a request to obtain the right of way. This may be important if drivers 210, 211 and those subsequently thereafter also appear determined to go straight. To do so, driver 216 would send a request to driver 212's apparatus running software capable for negotiating a right-of-way. If an agreement is reached, driver 216 would be able to make a turn at the traffic intersection prior to driver 212 proceeding straight. While any apparatus may be employed by the drivers and pedestrians, it is envisaged that the apparatus is a smartphone, personal computer, laptop, tablet or wearable gadget operating the traffic management application thereon.

In another embodiment with respect to FIG. 2, driver 214 may wish to make a left hand turn at the intersection 201. However, individual 223 may wish to cross the intersection at the same time. Since individuals/pedestrians have the right-of-way at marked crosswalks and signalized pedestrian crossings according to U.S. traffic laws, the driver 214 may negotiate with individual 223 for a right-of-way. If the individual 223 approves the request, driver 214 would be permitted to turn at the traffic intersection prior to individual 223 crossing at the crosswalk.

According to another aspect of the application, a driver or individual having right-of-way may submit a request via a GUI on the display of the apparatus running the traffic management software. Specifically, the driver or individual may announce to the network that they are willing to assign their right of way to another. If the driver/individual receives an approved response meeting predetermined criteria, the right-of-way will be assigned to the approved responder. In return, the driver/individual will receive consideration including but not limited to currency or credits.

Figure 3:
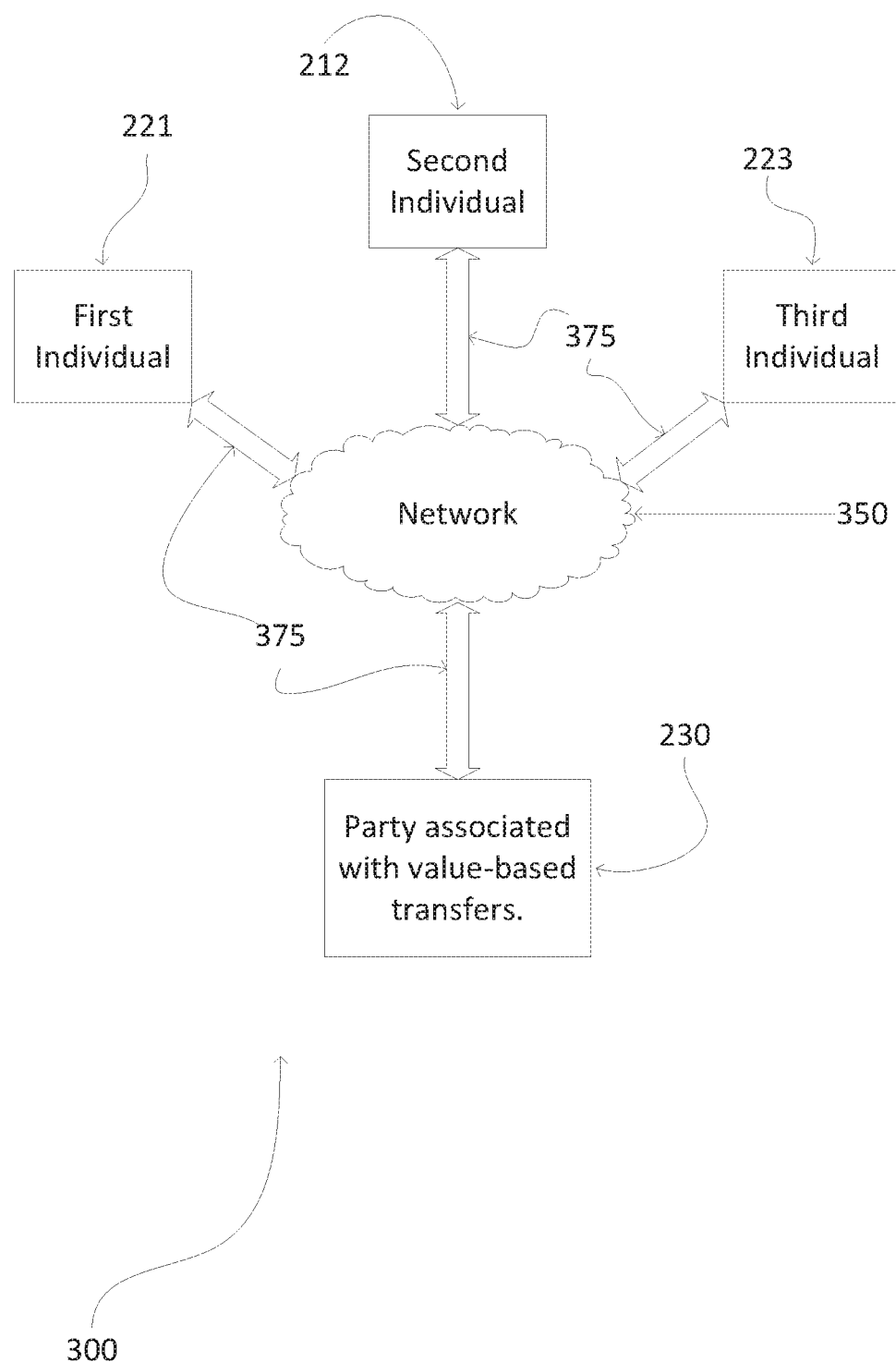
FIG. 3 depicts one embodiment of a system practicing the embodiments described herein.

According to another embodiment as shown in FIG. 3, the individuals and drivers described above in FIG. 2 are illustrated as belonging to a system 300 including a network 350. The network 350 may include a local area network (LAN), a wide area network (WAN), a personal area network (PAN), and/or combinations thereof. The network 350 is also described earlier in FIGS. 1A, 1B and 1C as communication network 12. These networking environments 300 are commonplace in offices, enterprise-wide computer networks, intranets, and the Internet via a mobile application. For instance, when used in a LAN networking environment, the system 300 is connected to the LAN through a network interface or adapter (not shown). When used in a WAN networking environment, the computing system environment typically includes a modem or other means for establishing communications over the WAN, such as the Internet. The modem, which may be internal or external, may be connected to a system bus via a user input interface, or via another appropriate mechanism. In a networked environment, program modules depicted relative to the system 300, or portions thereof, may be stored in a remote memory storage device such as storage medium 44 and 46 described above with regard to FIG. 1C. Devices, as shown in FIG. 1C, which are operated by drivers or individuals may communicate over network 350 through one or more communications links 375 formed between data interfaces of one or more devices. Communication links 375 may include either wired or wireless links. Preferably, the links are wireless over Wi-Fi or cellular. It is to be appreciated that the illustrated network connections of FIG. 3 are exemplary and other means of establishing a communications link between multiple devices may be used.

Figure 4:
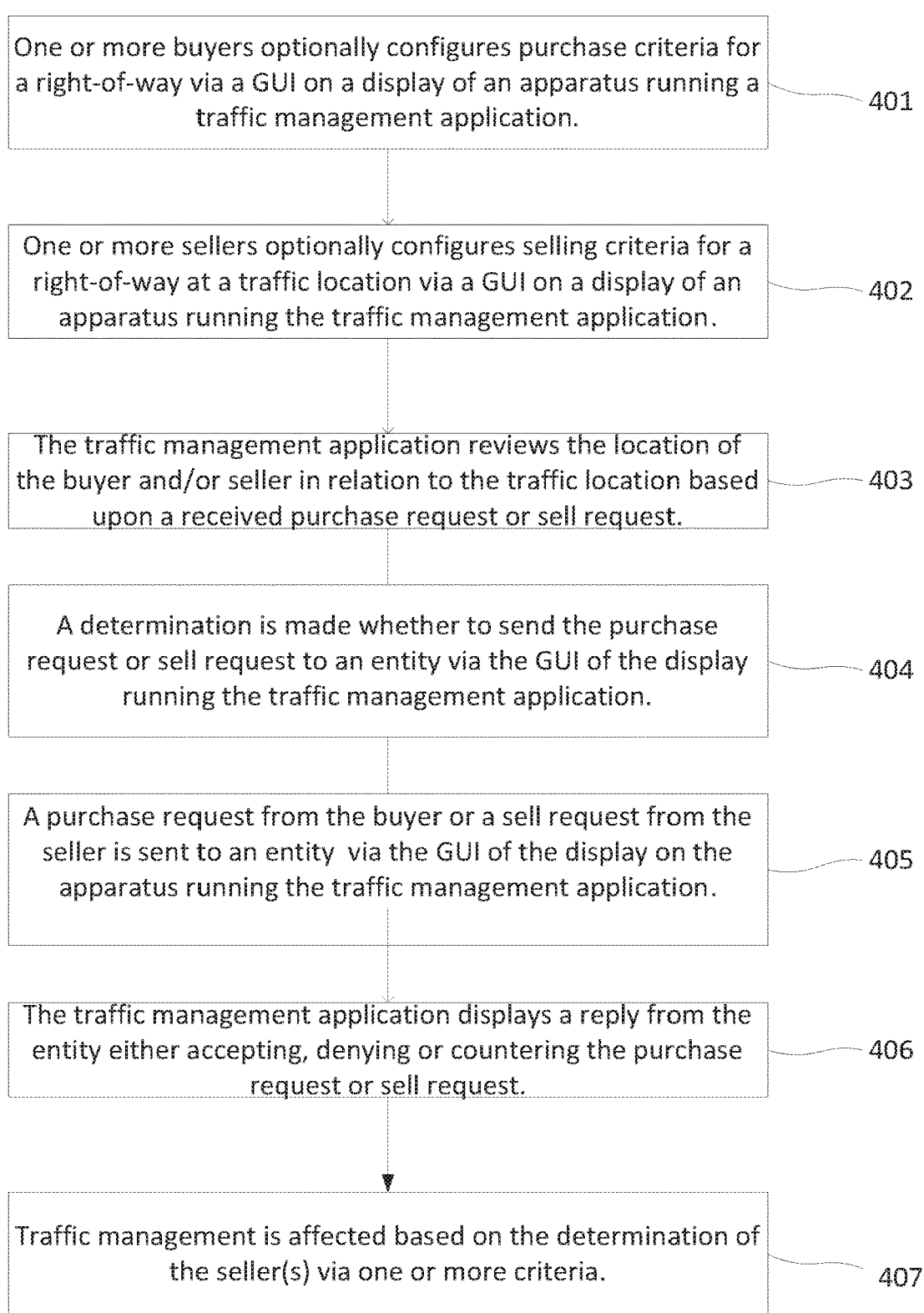
FIG. 4 is a flowchart depicting illustrative operation of the system of FIG. 3; and A component or a feature that is common to more than one drawing is indicated with the same reference number in each of the drawings.

According to another aspect of the application, in reference to the flow diagram illustrated in FIG. 4, an exemplary process 400 is described for utilizing one or more architectures and/or methods. The architecture includes an application on a display having a GUI which the buyer and seller having a right-of-way communicate through. Beginning at step 401, a buyer may optionally configure purchase criteria. For example, the buyer may identify situations, which, should they occur, the buyer would like to make purchasing offers to alter traffic management. For exemplary purposes only, the buyer may indicate that if the buyer is in route to an appointment but it looks like the buyer will be late, the buyer may indicate that the buyer is willing to allocate X units of currency (e.g., 0.1 bitcoins, $10) to speed up the buyer's travels. This may be done via the GUI appearing on the display 42 of the apparatus 30 as described above with regard to FIG. 1C.

In another embodiment, the buyer may indicate it wishes to purchase, and/or be presented the option to purchase, the right to affect travel with respect to a specific intersection (that may have a particularly long wait time). The request sent to the GUI may include information including but not limited to price for the right of way, distance of the entity from the traffic location, duration of time for the right of way, and time limit for the entity, i.e., seller, to accept the request.

Similarly, one or more sellers may optionally configure selling criteria for the right-of-way. For example, the seller may indicate that, unless they are projected to be late for a known appointment that the seller is willing to wait for any amount of money, or any amount of money above a certain threshold (e.g., 5 U.S. cents per light, 1 U.S. cent per extended second at a light and/or intersection). As described above for buyers, the seller's request may include information including but not limited to price for the right of way, distance of the entity from the traffic location, duration of time for the right of way, and time limit for the entity, i.e., buyer, to accept the request.

According to an embodiment, the graphical user interface may also include a real-time bidding option. Here, the seller of the right-of-way may initiate real-time bidding from a prompt on the GUI. This may be appropriate in situations such as a four-way stop sign, a blinking traffic light, or when traffic lights have gone out after a storm.

According to step 403 in FIG. 4, the location of the buyer and/or seller is reviewed by a traffic management application in relation to the traffic location. The buyer and/or seller may be may be a driver and/or a pedestrian. In an embodiment, the application may also be configured to review a route of the buyer to employ predictive traffic management. The reviewed location may be performed via GPS or a similar tool commonly use in the art used to track the location and path of the buyer or seller.

It is further envisaged in an embodiment of step 403 that restrictions may be placed on whether a party may purchase a traffic adjustment. For example, the systems and methods described herein may have the ability to make such purchases based on whether the possible purchaser is in the area (e.g., whether the potential purchaser is within a certain radius of the intersection about which the traffic adjustment is taking place). In another example, the direction of the possible purchaser may affect whether he/she may purchase a traffic adjustment (e.g., under this paradigm, in FIG. 2 vehicle driver 215 may be prevented from purchasing a traffic adjustment at that intersection because vehicle driver 215 is moving in a direction away from the intersection). Yet even further, the restrictions may include a minimum balance in the account of the purchaser if they are not using credit card.

Next, a determination is made whether to send the purchase request from the buyer to the entity, i.e., seller (step 404). Alternatively, a determination is made whether to send the sell request from the seller to the entity, i.e., buyer (step 404). The traffic management application has been developed to handle buyer and seller requests with equal efficiency.

In an embodiment, the request may manually be initiated by the buyer or seller. That is, the predetermined criteria is not employed. The GUI of the traffic management application may include a prompt for manual selection by the buyer or seller. Here, when the buyer or seller is at a traffic location and knows who the other entity, i.e., driver or pedestrian, is based on the GPS tracking function, they may directly send the other entity a request via the traffic management application. The traffic management application is configured to display an indicator, for example a blue blinking dot, of other active users in the vicinity willing to accept the request.

In yet another embodiment, the buyer may configure their purchasing settings as described above in step 1, for example, such that he/she will be presented with the option to purchase a right-of-way whenever less than four travel entities need to be purchased from (the term "travel entities" is utilized herein to represent the fact that a single vehicle may contain several people, but, in this example, only one purchase may need to be made to gain that vehicle's acceptance of a delay). Thus, to illustrate this point via FIG. 2, with respect to vehicle's 216 direction of travel, only three entities (pedestrian 223, vehicle 213, and vehicle 214) would need to acquiesce to a delay. In one scenario, the traffic management application acting under buyer's 216 (previous) instructions, offers are sent to the other parties (in this example: pedestrian 223, vehicle 213, and vehicle 214) for a traffic adjustment (e.g., that light 232 stays green for buyer 216, and/or that light 232 switches from red to green for buyer 216. The light 231 coordinates its light to be the opposite of light 232. In another scenario, the traffic management application acting under buyer's 116 (previous) instructions presents the buyer (e.g., via an audio interface) a query as to whether the buyer wishes to attempt to purchase the (continued) right-of-way. In reply the buyer 216 may respond in the affirmative (e.g., "Yes") and/or via an identification of how many units of currency to allocate for the transaction (e.g., "25 cents", "0.05 Bitcoins", "3 units" (whereas the term "unit" may have been pre-defined by buyer 216 as some unit of some currency, thus allowing buyer 216 to more quickly identify the importance, and associated amount of value, to buyer 216 that his/her travels be quicker)).

Next, the buyer's request for right-of-way is sent to one or more sellers to whom the request may be pertinent (step 405). Alternatively, the seller's request to sell a right-of-way is sent to one or more interested buyers to whom the request may be pertinent (step 405). Turning to FIG. 2 for illustrative purposes, if pedestrian 224 wishes to continue unimpeded, then vehicle 214 and vehicle 213 may be offered currency from pedestrian 224. Also, because vehicle 216, vehicle 211, and vehicle 212 all may also (hypothetically) turn onto the route of pedestrian 224, they may also be offered currency from pedestrian 224. This analysis with regard to whether other traveling entities may turn into the route of pedestrian 224 may be based on identification of the intended route of the entity (e.g., if their vehicle and/or smart phone knows where they are going), and/or the analysis with regards to identifying other traveling entities may simply be an identification that includes all traveling entities that may turn into the route of pedestrian 224. Further, the analysis with regard to whether other traveling entities may turn into the route of pedestrian 224 may also be based on an analysis on whether pedestrian 224 needs to purchase the acquiescence of other traveling entities (e.g., even if another traveling entity were to turn towards the path of pedestrian 224, if pedestrian 224 would still have the right-of-way then it would be redundant and unnecessary for pedestrian to financially compensate said party).

Thus, as has already been described above in the previous illustration(s), in one or more embodiments it is contemplated herein that entities (e.g., vehicles and/or pedestrians) may be grouped and/or organized according to what their travel paths are, and more particularly, according to whether a proposed traffic management event (or lack of an event (e.g., a signal not changing)) will affect those entities. Then, the time delay for the entities (be it the time delay for each entity as a combined total, and/or be it an average time delay for the entities) for each of two or more groups of entities traveling in separate directions may be compared, and a third party (e.g., a municipality) may default towards minimizing the time delay (unless one or more parties transfer value to override that default. Thus, turning to FIG. 2 for illustrative purposes, and again referring to the previously described examples which describe similar and/or the same type of situations, travelers in a certain direction may be grouped together and compared against travelers in a different (opposite) direction. Further, the time delay for the entities may be calculated according to their actual traveling speed, their expected traveling speed, the speed limit, and/or any combination thereof.

According to step 406, the management application displays a reply from the entity, i.e., seller in relation to a purchase request or a buyer in relation to a sell request. The entity's reply may be an acceptance, denial or counter offer. The reply may be based upon predetermined criteria set by the entity and automatically sent to the traffic management application from the entity. For example, if the buyer's offer meets predetermined criteria of the seller, the offer will be accepted. In another embodiment, if the buyer's offer does not meet predetermined criteria of the seller, the offer will be denied. In yet another embodiment, the offer may be countered.

In yet even another embodiment, the reply may be manually performed by the user without employing predetermined criteria. This may be helpful in scenarios where the pedestrian or driver has more time than commonly available to them. As a result, they are able to make decisions somewhat different from their predetermined criteria.

Finally, based on the results of the one or more transactions, traffic is adjusted accordingly (step 407). Turning again to FIG. 2 for illustrative purposes, lights 231 and 232 may be switching the right-of-way (e.g., changing which light is green and which is red), and/or it may be maintaining the lights in the same configuration (e.g., the "adjustment" may itself be the lack of an action that would otherwise have occurred).

In yet even another aspect of the application, a smart traffic light for managing traffic is provided. The smart traffic light includes plural lights of different colors and is shown in FIG. 2 and includes the hardware illustrated in FIG. 1C. The smart traffic light includes a transceiver 34 for communicating with a traffic management application on a user's apparatus. The smart traffic light also includes a controller including a processor 32 that communicates with the traffic management application on the user's device, and is configured to execute a set of instructions. One of the instructions includes receiving, from the traffic management application associated with a user, a request to alter a traffic situation. Another one of the instructions includes reviewing information in the request associated with approval for updating a traffic pattern. Even further, the processor is configured to send instructions to a signal function to update the signal.

In an embodiment of this aspect, there also includes executable instructions confirming to the traffic management application that the signal has been updated by the smart traffic light. This provides certainty of which entity truly has right-of-way in the event of a dispute.

Further, although much of the description herein refers to traffic management at intersections, it is contemplated herein that the systems and methods described herein may be utilized at any location and/or area that would be practicable. For example, if someone wishes to make a left turn across traffic into his/her driveway, he/she could purchase the right for the oncoming traffic to wait long enough for the turn to be performed.

While the systems and methods have been described in terms of what are presently considered to be specific aspects, the application need not be limited to the disclosed aspects. Although at least one series of steps are presented as an exemplary method of practicing one or more embodiments described herein, it will be appreciated by those skilled in the art that the steps identified may be practiced in any order that is practicable, including, without limitation, the omission of one or more steps. It is intended to cover various modifications and similar arrangements included within the spirit and scope of the claims, the scope of which should be accorded the broadest interpretation so as to encompass all such modifications and similar structures.

What is claimed is:

1. A smart traffic light for managing traffic comprising:
   lights of different colors that are controlled to create a signal comprising a configuration of one or more of the lights being switched on;
   a transceiver for communicating with a traffic management application; and
   a controller including a processor configured to execute the following instructions:
   receiving, from the traffic management application associated with a user, a request to alter a traffic pattern for right-of-way;
   reviewing information in the request associated with approval for updating the traffic pattern; and
   sending instructions to update the signal by changing the configuration according to the requested right-of-way and the updated traffic pattern.

2. The smart traffic light of claim 1, wherein the executable instructions comprise sending a confirmation of the signal update to the traffic management application.

3. The smart traffic light of claim 1, wherein the request is from the user and receiving the request comprises an approval from the traffic management application based on a distance and direction of the user in relation to the smart traffic light.

4. The smart traffic light of claim 3, wherein the distance and direction of the user are determined based on a global positioning system (GPS) signal of a device associated with the user and operating the traffic management application.

5. The smart traffic light of claim 3, wherein the user has permission to make the request based on the distance and direction based on the reviewing.

6. The smart traffic light of claim 1, wherein the requested right-of-way is over a plurality of entities in an area of the smart traffic light.

7. The smart traffic light of claim 6, wherein each of the one or more entities of the plurality of entities has set, in the traffic management application, a predefined threshold price per time period of waiting during a duration of the requested right-of-way by the one or more entities in the area.

8. The smart traffic light of claim 7, wherein, upon receiving an acceptance of the request from each of the one or more entities at the smart traffic light, the controller executes the instructions to update the signal according to the requested right-of-way.

9. The smart traffic light of claim 8, wherein the request comprises a duration of time for the right-of-way and an offered price, and wherein the acceptance is based on an offer price of the request meeting or exceeding the predefined threshold price set by each of the one or more entities.

10. The smart traffic light of claim 1, wherein the lights of different colors comprise a red light and a green light and wherein updating the signal according to the requested right-of-way comprises delay switching between the red light and the green light.

11. A smart traffic light for managing traffic comprising:
a plurality of lights;
a transceiver for communicating with a traffic management application; and
a controller that controls timing of the plurality of lights and that is configured to execute instructions to:
receive, from the traffic management application associated with a user, an approved request for right-of-way of the user, wherein the approved request comprises an acceptance of a duration of time for the right-of-way and an offered price by one or more entities in an area of the smart traffic light, wherein the one or more entities have set threshold prices per time period of waiting during the duration of the right-of-way by the one or more entities and wherein the acceptance is based on the offered price of the approved request meeting or exceeding the set threshold prices set by each of the one or more entities; and
overriding control of the timing of the plurality of lights based on the acceptance.

12. The smart traffic light of claim 11, wherein the request is from the traffic management application operating on a user device.

13. The smart traffic light of claim 12, wherein the request is communicated to the smart traffic light from the user device via a cellular communications network.

14. The smart traffic light of claim 11, wherein the traffic management application operating on the user device comprises a service layer that is implemented in a cloud server.

15. The smart traffic light of claim 11, wherein overriding control of the timing comprising switching between a red light and a green light to provide the right-of-way to the user for the duration of time of the right-of-way.

16. The smart traffic light of claim 11, wherein overriding control of the timing comprising maintaining a red light and a green light in a same configuration to provide the right-of-way to the user for the duration of time of the right-of-way.

17. The smart traffic light of claim 11, wherein the right-of-way is over the one or more entities in the area of the smart traffic light.

18. The smart traffic light of claim 11, wherein the one or more entities are identified as being in the area via GPS tracking.

19. The smart traffic light of claim 11, comprising a GPS chipset configured to provide location information to the traffic management application.

\* \* \* \* \*